United States Patent [19]
Walpole

[11] 3,750,536
[45] Aug. 7, 1973

[54] ROD ALIGNMENT DEVICE FOR FLUID POWER CYLINDERS

[75] Inventor: Floyd K. Walpole, Kaneohe, Hawaii

[73] Assignee: The United States of America as represented by the Secretary of the Army.

[22] Filed: Oct. 6, 1971

[21] Appl. No.: 187,033

[52] U.S. Cl. .................................................. 92/165
[51] Int. Cl. ............................................. F16j 11/00
[58] Field of Search ...................... 92/165, 167, 172, 92/168, 85

[56] References Cited
UNITED STATES PATENTS

| | | | |
|---|---|---|---|
| 373,072 | 11/1887 | Jarvis | 92/167 |
| 2,350,898 | 6/1944 | Jetter | 92/165 |
| 3,333,513 | 8/1967 | Wettstein | 92/165 R |
| 3,251,276 | 5/1966 | Volkmann | 92/85 |
| 3,403,600 | 10/1968 | Bade | 92/168 |
| 3,311,030 | 3/1967 | Halstead | 92/167 |
| 3,171,334 | 3/1965 | Rasmussen | 92/165 R |
| 770,016 | 9/1904 | Miller | 92/165 |

FOREIGN PATENTS OR APPLICATIONS

| | | | |
|---|---|---|---|
| 529,885 | 11/1940 | Great Britain | 92/172 |
| 1,123,901 | 10/1956 | France | 92/172 |
| 153,360 | 2/1956 | Sweden | 92/165 R |

*Primary Examiner*—Manuel A. Antonakas
*Assistant Examiner*—R. H. Lazarus
*Attorney*—William C. Gapcynski, Leonard Flank and Lawrence A. Neureither

[57] ABSTRACT

A piston is mounted in a cylinder and provided with means for allowing axial and/or angular misalignment of a piston rod with respect to the axial center-line of its rigidly mounted cylinder. A rod alignment tube seals the piston in the cylinder without imposing restrictions (or undue added friction) on the piston rod during axial or angular movement thereof.

4 Claims, 3 Drawing Figures

Floyd K. Walpole,
INVENTOR.

Floyd K. Walpole,
INVENTOR.

ROD ALIGNMENT DEVICE FOR FLUID POWER CYLINDERS

BACKGROUND OF THE INVENTION

Presently, a piston and cylinder assembly are available in which the piston rod is allowed a predetermined amount of radial and axial movement with respect to the axial center-line of a rigidly mounted cylinder. However, such assemblies usually result in binding of the parts if axial off-set is achieved.

SUMMARY OF THE INVENTION

The device of the present invention overcomes the above-noted deficiencies by utilizing in conjunction with a rigidly mounted cylinder, a piston having tapered peripheral surfaces and a rod alignment tube which seals the cylinder rod to the cylinder without imposing restriction to axial and/or angular misalignment of the piston rod to its axial center line of its rigidly mounted cylinder.

The piston is an annular member having a slight taper extending from its outer substantially parallel faces toward a transverse axis which is normal to the longitudinal axis of the annulus. A pair of "O" ring seals are mounted circumferentially about the piston, substantially equidistant from the piston faces and on opposite sides of the transverse axis.

A rod alignment tube is mounted about the piston rod and seals the piston rod in the cylinder. The alignment tube is provided with an annular tapered, internal surface disposed in spaced relation with the piston rod to allow angular movement of the rod in the alignment tube. A cylinder head secures the alignment tube to the cylinder and allows angular displacement of the alignment tube and piston rod with respect to the axial center-line of the cylinder.

It is, therefore, an object of the present invention to provide a piston and cylinder assembly in which substantially all binding tendencies in the assembly are eliminated.

It is another object of the present invention to provide such an assembly in which both angular and/or axial misalignment of the attachment end of a piston rod with respect to the axial center-line of a rigidly mounted cylinder is accommodated with no binding and low resistance to such movement of the rod.

These and other object of the present invention will be more readily apparent from the following description and drawing.

DESCRIPTION OF THE PREFERRED EMBODIMENT

Figure 1:
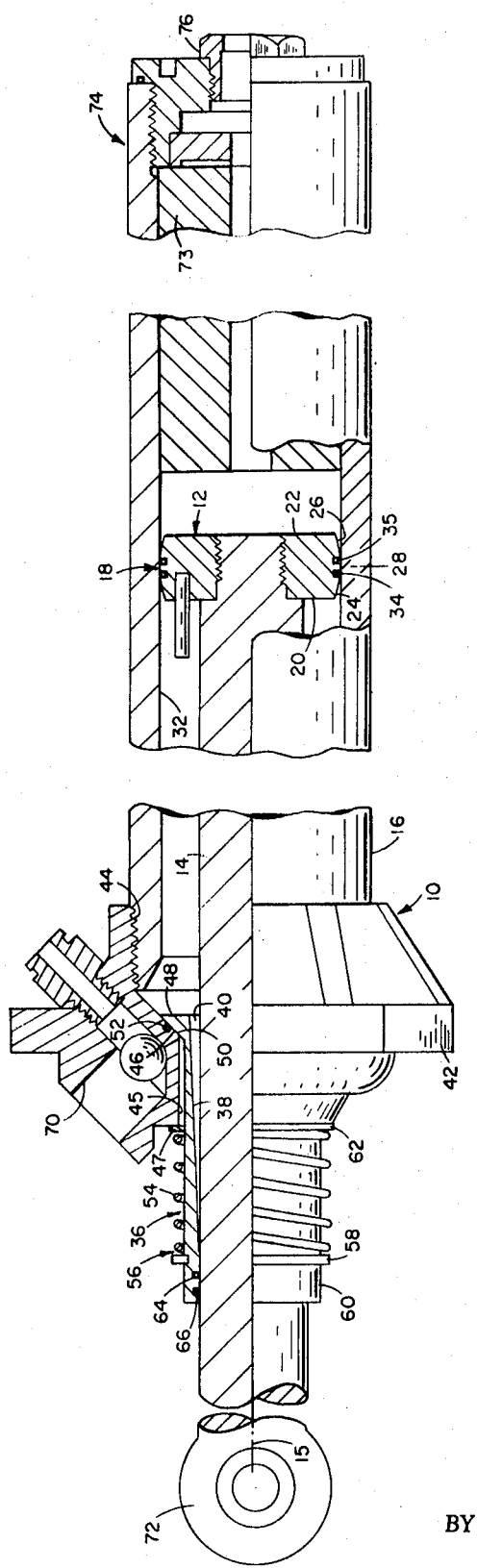
FIG. 1 is an elevational view, partially in section, of the rod alignment device of the present invention.

In reference now to FIG. 1, a fluid actuator assembly 10 is generally shown to include a piston 12 having a piston rod 14 secured thereto, and a cylinder 16 in which the piston and rod are reciprocally carried.

Figure 3:
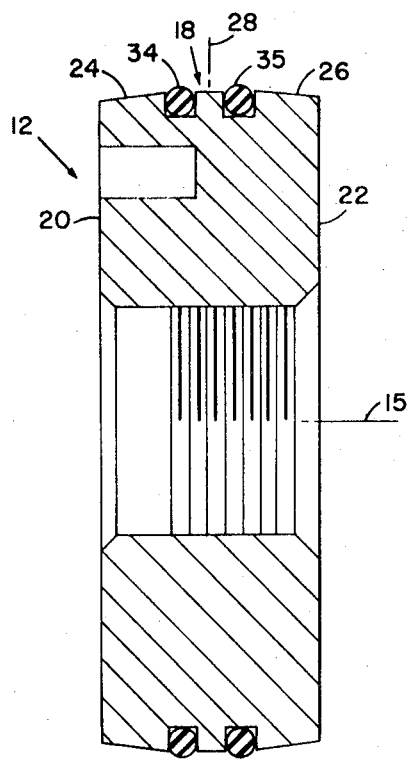
FIG. 3 is an elevational view partially in section illustrating the piston of the assembly illustrated in FIG. 1.

To allow piston 12 to achieve a "rocking" motion thereof with respect to the axial center-line 15 of cylinder 16, the outer peripheral edge 18 of the piston (FIGS. 1 and 3) is provided with tapered surfaces 24 and 26 which extend from faces 20 and 22, respectively, to a transverse axis 28 which is substantially in normal relation to the longitudinal axis 15 of the cylinder.

To seal the piston in the cylinder and prevent motive fluid from flowing between edge 18 of the piston and an internal surface 32 of the cylinder, a pair of seals 34 and 35 are carried, respectively, in a pair of grooves which are disposed on peripheral edge 18 substantially equidistant from faces 20 and 22, respectively. The seals may be O-rings of suitable elastormeric or thermo-plastic material, or, if desired, seals 34 and 35 may be metallic, step cut, piston rings.

Figure 2:
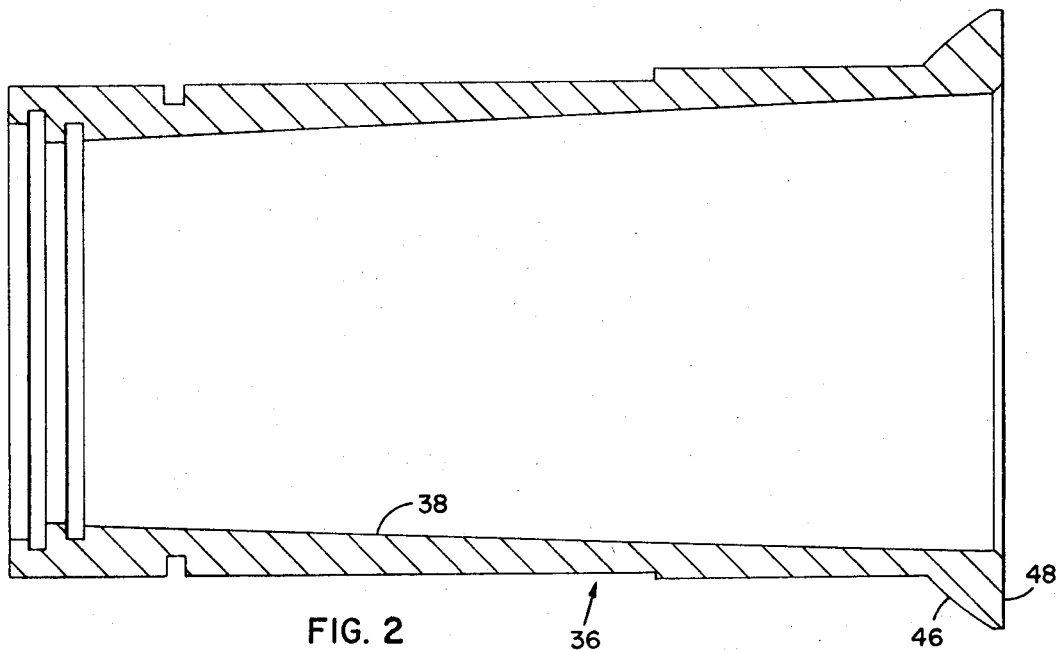
FIG. 2 is an enlarged elevational sectional view of the rod alignment tube shown in FIG. 1.

To seal the piston rod 14 to cylinder 16 in a manner which will not impose restriction (or undue friction) to angular and/or axial movement of the piston rod, a rod alignment tube 36 (FIGS. 1 and 2) is carried about piston rod 14 and is provided with an internal, tapered, annular surface 38 to provide a clearance 40 between the piston rod and the tube 36.

Alignment tube 36 is secured about piston rod 14 by a cylinder head 42 which is carried about the alignment tube and piston rod 14. The cylinder head is disposed in threaded relation with a threaded end 44 of cylinder 16, and is provided with an internal tapered surface 45 to form a space 47 between internal surface 45 and the outer surface of tube 36.

To form an external seal for the assembly, alignment tube 36 (FIGS. 1 and 3) is provided with a spherical seat 46 disposed adjacent an end 48 of tube 36. Cylinder head 42 is provided with a seat 50 having an O-ring seal 52 carried therein (FIG. 1) adjacent to the point of tangency of spherical seat 46 and seat 50.

To insure that seat 50 of cylinder head 42 and spherical surface 46 are maintained in abutting relation, a compression spring 54 is carried circumferentially about tube 36 with a first end 56 of spring 54 in abutting relation with a spring retainer 58 which is rigidly secured to tube 36 adjacent an end 60 thereof. The other end of spring 54 is seated against a washer 62 carried in circumferential sliding relation on the other side of washer 62, so that operating pressure of the fluid power media (gas, oil, or other liquid) increases the initial contact pressure between seat 50 of the cylinder head and spherical seat 46 of tube 36. To further seal the piston rod 14 to tube 36 on O-ring 64 is provided adjacent end 60 of tube 36 intermediate piston rod 14 and internal surface 38 of tube 36.

To maintain the piston rod in substantially smooth condition and free from debris which would tend to destroy O-ring 64, a scraper 66 is provided intermediate inner surface 38 of tube 36 and the outer surface of piston 14, adjacent O-ring 64.

The actuator of the present invention may be utilized in applications requiring rapid movement of very heavy objects. One example of such use would be found in the missile field wherein missiles are fired from underground launch stations. Typically, such launch stations use doors which may weight thousands of pounds and must be rapidly moved to permit rapid launch of the missile. In such operation, a gas generator is disposed in communication with the interior of cylinder 16 through port 70 disposed in cylinder head 42. The distal end 72 of piston rod 14 is connected to the door (not shown) in a manner which will permit acceptance of the necessary misalignment between the door and the piston rod. Such a connection is provided by utilizing a spherical bearing at end 72 of the piston rod. Cylinder 16 is rigidly secured to concrete pads adjacent the launch station (not shown). In operation, the gas generator is ignited and gases are injected into cylinder 16 against the face 20 of piston 12. Movement of the piston displaces the heavy launch cell door. A decelerator cartridge of Hexcel Alum honeycomb 73, or the like, is carried in the cylinder adjacent an end 74 thereof to serve as a decelerator for the fast moving piston. A rupture disk 76 is secured in the end 74 of cylinder 16.

I claim:

1. A rod alignment apparatus for a fluid power cylinder to selectively provide for angular and axial misalignment of the attachment end of a piston rod with respect to the axial center-line of a cylinder comprising:
   a. a rigidly mounted cylinder;
   b. a piston mounted in said cylinder and provided with tapered radial surfaces adjacent the internal surface of said cylinder;
   c. an alignment tube mounted about said piston rod and a cylinder head disposed about said alignment tube and in secured relation with a first end of said cylinder, said alignment tube having a longitudinal portion thereof external of said cylinder and remote from said cylinder head in contact with said piston rod and having an internal annular surface extending from said contacting portion spaced from said piston rod in a uniformly increasing manner toward an opposite terminal end thereof to provide a uniformly increasing space between said internal annular surface of said alignment tube and said piston rod, said terminal end including a terminal portion having an external sperical surface, said cylinder head provided with an internal spherically surfaced seat for engagement with said external sperical surface of said terminal portion;
   d. sealing means between said longitudinal portion of said alignment tube in contact with said piston rod; and
   e. biasing means surrounding said alignment tube and located between abutments on said cylinder head and said alignment tube for increasing the extent of engagement between said internal spherically surfaced seat of said cylinder head and said external sperical surface of said terminal portion.

2. Apparatus as in claim 1 wherein said biasing means is a spring circumferentially mounted about said alignment tube.

3. Apparatus as in claim 1 wherein said piston is provided with seal means on the outer peripheral edge thereof.

4. Apparatus as in claim 1 including decelerating means carried in said cylinder adjacent a second end thereof for decelerating and stopping the movement of said piston responsive to displacement thereof.

* * * * *